US009976441B2

(12) United States Patent
Lacy et al.

(10) Patent No.: US 9,976,441 B2
(45) Date of Patent: May 22, 2018

(54) ARTICLE, COMPONENT, AND METHOD OF FORMING AN ARTICLE

(71) Applicant: GENERAL ELECTRIC COMPANY, Schenectady, NY (US)

(72) Inventors: Benjamin Paul Lacy, Greer, SC (US); Gary Michael Itzel, Simpsonville, SC (US); Srikanth Chandrudu Kottilingam, Simpsonville, SC (US); Sandip Dutta, Greenville, SC (US); David Edward Schick, Greenville, SC (US)

(73) Assignee: General Electric Company, Schenectady, NY (US)

( * ) Notice: Subject to any disclaimer, the term of this patent is extended or adjusted under 35 U.S.C. 154(b) by 210 days.

(21) Appl. No.: 14/725,374

(22) Filed: May 29, 2015

(65) Prior Publication Data
US 2016/0348536 A1  Dec. 1, 2016

(51) Int. Cl.
*F01D 25/12* (2006.01)
*F01D 5/18* (2006.01)
(Continued)

(52) U.S. Cl.
CPC ............. *F01D 25/12* (2013.01); *F01D 5/189* (2013.01); *F01D 9/02* (2013.01); *B33Y 10/00* (2014.12);
(Continued)

(58) Field of Classification Search
CPC .......... F01D 5/188; F01D 5/189; F01D 25/12; F01D 9/02; B33Y 10/00; B33Y 80/00; F05D 2230/31; F05D 2260/201
See application file for complete search history.

(56) References Cited

U.S. PATENT DOCUMENTS 4,312,624 A   1/1982 Steinbauer, Jr. et al.
5,207,556 A   5/1993 Frederick et al.
(Continued)

FOREIGN PATENT DOCUMENTS

EP   0 182 588 A1   5/1986
EP   0 599 055 A1   6/1994
(Continued)

OTHER PUBLICATIONS

Lacy et al., Apr. 16, 2015, U.S. Appl. No. 14/688,436.
(Continued)

*Primary Examiner* — Aaron R Eastman
(74) *Attorney, Agent, or Firm* — McNees Wallace & Nurick LLC

(57) ABSTRACT

An article and method of forming an article are provided. The article includes a body portion separating an inner region and an outer region, an aperture in the body portion, the aperture fluidly connecting the inner region to the outer region, and a conduit extending from an outer surface of the body portion at the aperture and being arranged and disposed to controllably direct fluid from the inner region to the outer region. The method includes providing a body portion separating an inner region and an outer region, providing an aperture in the body portion, and forming a conduit over the aperture, the conduit extending from an outer surface of the body portion and being arranged and disposed to controllably direct fluid from the inner region to the outer region. The article is arranged and disposed for insertion within a hot gas path component.

20 Claims, 7 Drawing Sheets

(51) Int. Cl.
*F01D 9/02* (2006.01)
*B33Y 10/00* (2015.01)
*B33Y 80/00* (2015.01)

(52) U.S. Cl.
CPC .......... *B33Y 80/00* (2014.12); *F05D 2230/31* (2013.01); *F05D 2260/201* (2013.01)

(56) References Cited

U.S. PATENT DOCUMENTS

| | | | |
|---|---|---|---|
| 5,464,322 | A | 11/1995 | Cunha et al. |
| 5,586,866 | A * | 12/1996 | Wettstein ................ F01D 5/189 416/96 A |
| 5,772,398 | A | 6/1998 | Noiret et al. |
| 6,000,908 | A * | 12/1999 | Bunker .................. F01D 5/189 165/908 |
| 6,237,344 | B1 | 5/2001 | Lee |
| 6,391,251 | B1 | 5/2002 | Keicher et al. |
| 6,659,714 | B1 * | 12/2003 | Tiemann ................ F01D 5/188 415/115 |
| 7,246,993 | B2 | 7/2007 | Bolms et al. |
| 7,789,125 | B2 | 9/2010 | Mayer et al. |
| 8,127,552 | B2 | 3/2012 | Schumacher et al. |
| 8,137,056 | B2 | 3/2012 | Fujimoto et al. |
| 8,152,468 | B2 | 4/2012 | Propheter-Hinckley et al. |
| 8,444,376 | B2 | 5/2013 | Krueckels et al. |
| 9,347,324 | B2 * | 5/2016 | Lee ......................... F01D 5/188 |
| 2004/0226701 | A1 | 11/2004 | Lomax, Jr. et al. |
| 2007/0169992 | A1 | 7/2007 | Wasif et al. |
| 2009/0324385 | A1 | 12/2009 | Liang |
| 2010/0124485 | A1 | 5/2010 | Tibbott |
| 2011/0123351 | A1 | 5/2011 | Hada et al. |
| 2013/0081401 | A1 | 4/2013 | Kim |
| 2013/0156549 | A1 | 6/2013 | Maldonado |
| 2014/0064913 | A1 | 3/2014 | Adavikolanu et al. |
| 2014/0093379 | A1 | 4/2014 | Tibbott et al. |
| 2014/0093392 | A1 * | 4/2014 | Tibbott .................. F01D 5/189 416/97 R |
| 2014/0099476 | A1 | 4/2014 | Subramanian et al. |

FOREIGN PATENT DOCUMENTS

| | | |
|---|---|---|
| EP | 0 698 725 A2 | 2/1996 |
| EP | 0 887 515 A1 | 12/1998 |
| EP | 2256297 B1 | 12/2010 |
| EP | 2 369 235 A2 | 9/2011 |
| EP | 2 708 296 A2 | 3/2014 |
| EP | 2 716 868 A2 | 4/2014 |
| EP | 2 853 323 A2 | 4/2015 |
| GB | 2 492 374 A | 1/2013 |
| JP | 2011-089461 A | 5/2011 |
| JP | 2012202342 A | 10/2012 |
| WO | 03/062607 A1 | 7/2003 |
| WO | 2013/160198 A1 | 10/2013 |
| WO | 2015/042009 A1 | 3/2015 |
| WO | 2015/112384 A1 | 7/2015 |

OTHER PUBLICATIONS

Lacy et al., Sep. 8, 2015, U.S. Appl. No. 14/847,347.
Lacy et al., Sep. 8, 2015, U.S. Appl. No. 14/847,409.
Lacy et al., Sep. 8, 2015, U.S. Appl. No. 14/847,445.
Extended European Search Report and Opinion issued in connection with related EP Application No. 16185770.1 dated Jan. 5, 2017.
Extended European Search Report and Opinion issued in connection with related EP Application No. 16187171.0 dated Apr. 13, 2017.
Extended European Search Report and Opinion issued in connection with related EP Application No. 16187452.4 dated Apr. 13, 2017.
Non-Final Rejection towards related U.S. Appl. No. 14/847,409 dated May 8, 2017.
Extended European Search Report and Opinion issued in connection with related EP Application No. 16164625.2 dated Aug. 29, 2016.
Extended European Search Report and Opinion issued in connection with corresponding EP Application No. 16169984.8 dated Sep. 27, 2016.

* cited by examiner

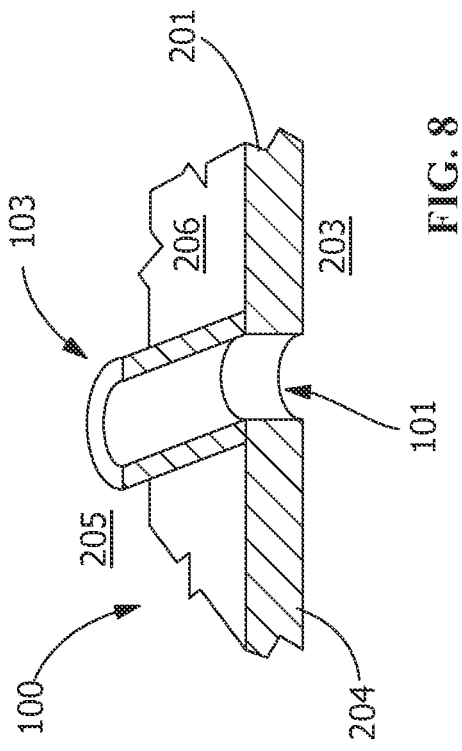
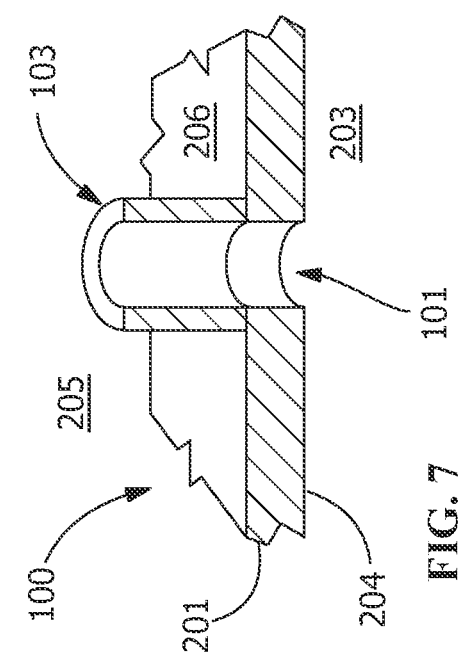
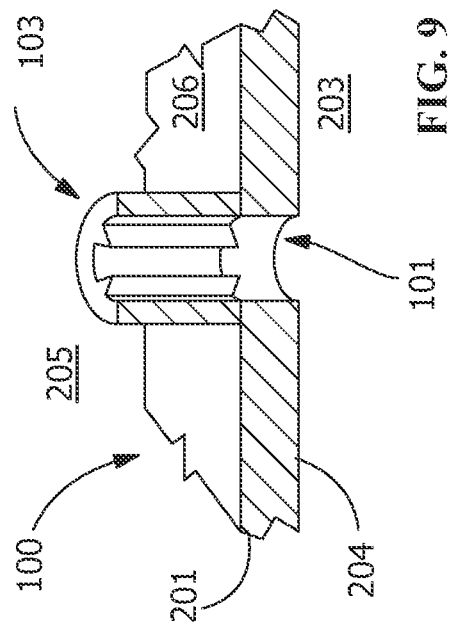

ARTICLE, COMPONENT, AND METHOD OF FORMING AN ARTICLE

STATEMENT REGARDING FEDERALLY SPONSORED RESEARCH

This invention was made with government support under contract number DE-FC26-05NT42643 awarded by the Department of Energy. The government has certain right in this invention.

FIELD OF THE INVENTION

The present invention is directed to an article, a component, and a method of forming an article. More particularly, the present invention is directed to a cooling article, a cooled component including the cooling article, and a method of forming a cooling article.

BACKGROUND OF THE INVENTION

Turbine systems are continuously being modified to increase efficiency and decrease cost. One method for increasing the efficiency of a turbine system includes increasing the operating temperature of the turbine system. To increase the temperature, the turbine system must be constructed of materials which can withstand such temperatures during continued use.

In addition to modifying component materials and coatings, a common method of increasing temperature capability of a turbine component includes the use of cooling features. For example, one type of cooling feature includes an impingement member having apertures formed therein. The impingement member directs cooling fluid through the apertures and towards a surface that is intended to be cooled. However, it is often difficult to control the flow of the cooling fluid once it exits the apertures, particularly in the presence of cross-flow between the impingement member and the surface to be cooled. Furthermore, various components generally include portions which can be difficult to reach with cooling fluid flow from the impingement member.

To ensure sufficient cooling of the component, an increased amount of cooling fluid is typically passed through the apertures in the impingement member. As the cooling fluid is often provided from the compressed air in a turbine engine, passing an increased amount of cooling fluid through the apertures removes an increased portion of the compressed air prior to reaching the combustor. Removing an increased portion of compressed air may decrease efficiency and increase operating cost of the turbine engine.

BRIEF DESCRIPTION OF THE INVENTION

In an embodiment, an article includes a body portion separating an inner region and an outer region, an aperture in the body portion, the aperture fluidly connecting the inner region to the outer region, and a conduit extending from an outer surface of the body portion at the aperture and being arranged and disposed to controllably direct fluid from the inner region to the outer region.

In another embodiment, a component includes an article arranged and disposed to direct fluid toward an inner surface of the component. The article includes a body portion separating an inner region and an outer region, an aperture in the body portion, the aperture fluidly connecting the inner region to the outer region, and a conduit extending from an outer surface of the body portion at the aperture and being arranged and disposed to controllably direct fluid from the inner region to the outer region.

In another embodiment, a method of forming an article includes providing a body portion separating an inner region and an outer region, providing an aperture in the body portion, the aperture fluidly connecting the inner region to the outer region, and forming a conduit over the aperture, the conduit extending from an outer surface of the body portion at the aperture and being arranged and disposed to controllably direct fluid from the inner region to the outer region. The article is arranged and disposed for insertion within a hot gas path component of a turbine engine.

Other features and advantages of the present invention will be apparent from the following more detailed description, taken in conjunction with the accompanying drawings which illustrate, by way of example, the principles of the invention.

BRIEF DESCRIPTION OF THE DRAWINGS

FIG. 7 is a section view of an article according to an embodiment of the disclosure.

FIG. 8 is a section view of an article according to an embodiment of the disclosure.

FIG. 9 is a section view of an article according to an embodiment of the disclosure.

Wherever possible, the same reference numbers will be used throughout the drawings to represent the same parts.

DETAILED DESCRIPTION OF THE INVENTION

Provided are an article, a component, and a method of forming an article. Embodiments of the present disclosure, for example, in comparison to concepts failing to include one or more of the features disclosed herein, increase cooling efficiency, decrease cooling fluid use, increase control of fluid flow, provide fluid flow to difficult to reach areas, increase heat transfer, facilitate use of increased operating temperatures, provide concentration of fluid flow on hot spots, and combinations thereof.

Figure 1:
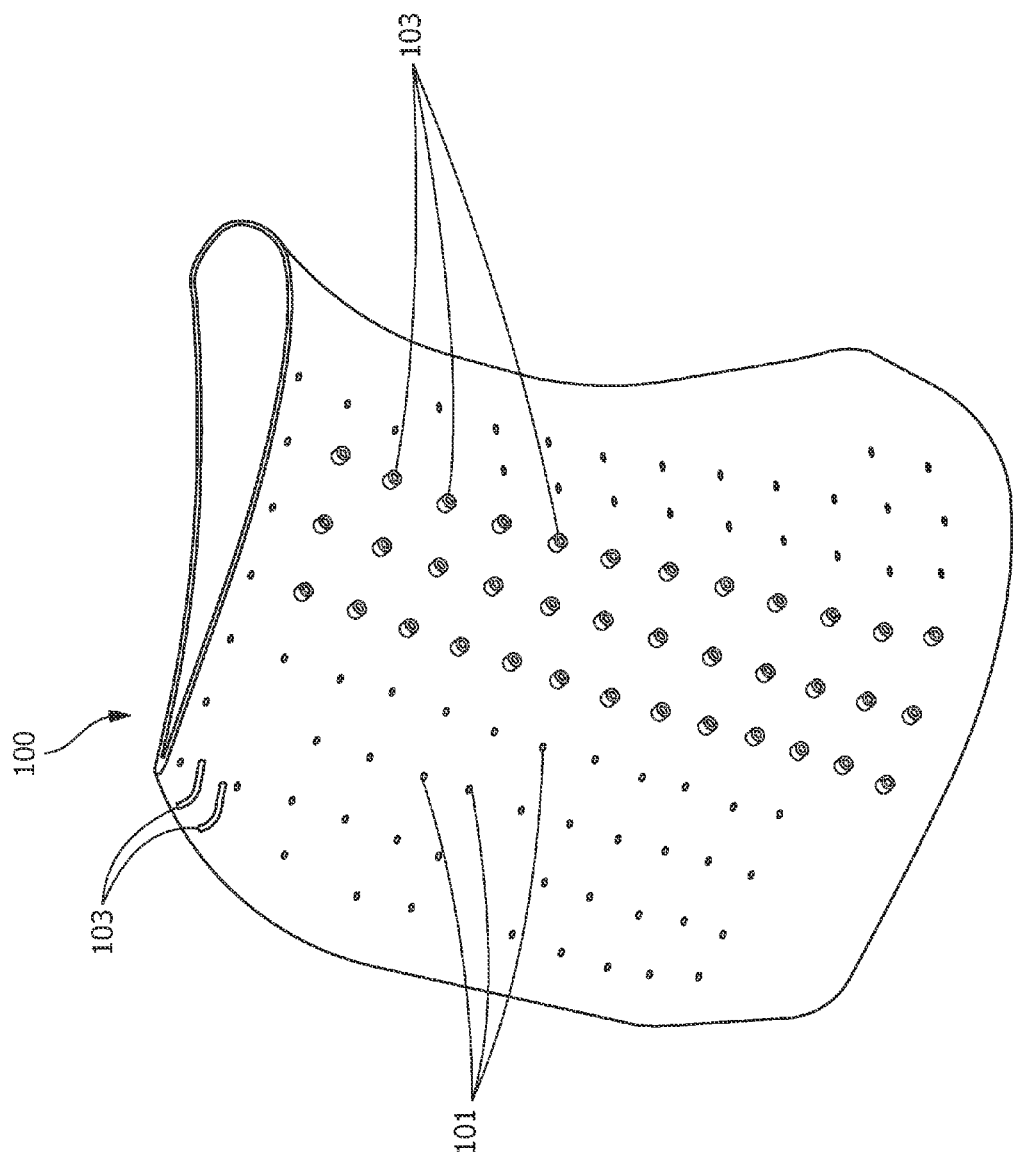
FIG. 1 is a perspective view of an article according to an embodiment of the disclosure.

An article 100 includes any suitable article for directing fluid flow within a turbine component. In one embodiment, as illustrated in FIG. 1, the article 100 includes one or more apertures 101 formed therein. For example, in another embodiment, the article 100 includes an impingement sleeve having a plurality of apertures 101. Although primarily described herein with regard to an impingement sleeve, as will be understood by those skilled in the art, the article 100 may include any other suitable article, such as, but not limited to, an impingement plate, multiple impingement plates, any other cooling article, or a combination thereof.

Figure 2:
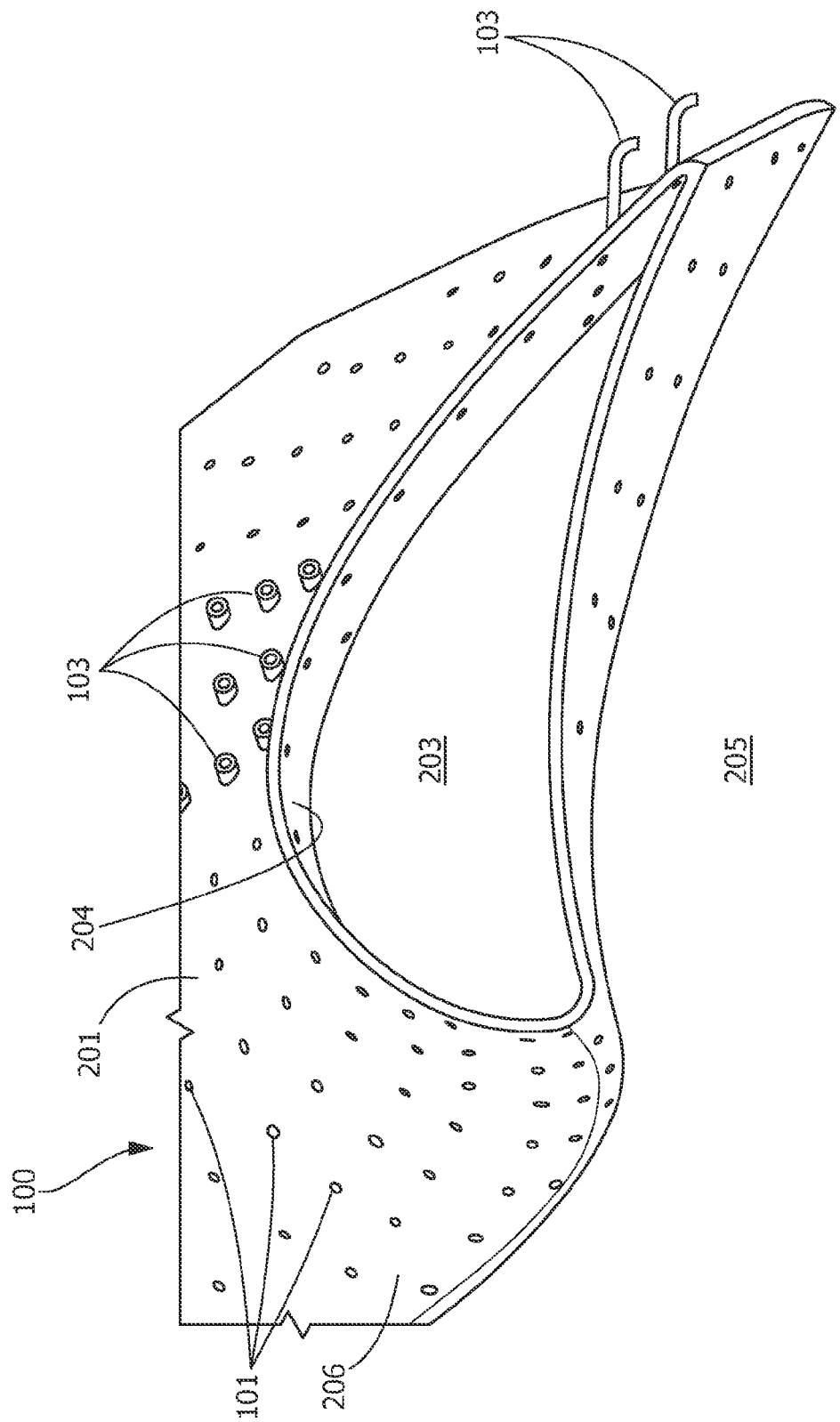
FIG. 2 is a section view of an article according to an embodiment of the disclosure.

Turning to FIG. 2, the apertures 101 are formed in a body portion 201 that defines and/or separates an inner region 203 and an outer region 205. The apertures 101 fluidly connect the inner region 203 to the outer region 205, providing fluid flow between the inner region 203 and the outer region 205. For example, in one embodiment, the apertures 101 extend between an inner surface 204 and an outer surface 206 of the body portion 201, facilitating a flow of cooling fluid from the inner region 203 to the outer region 205.

Each of the apertures 101 includes any suitable geometry for fluidly connecting the inner region 203 and the outer region 205. Suitable geometries include, but are not limited to, circular, substantially circular, round, substantially round, oval, non-round, square, triangular, star shaped, polygonal, tear drop, varied, irregular, any other geometrical shape, or a combination thereof. The geometry of the apertures 101 may be uniform, substantially uniform, or varied throughout the article 100, with the geometry of each of the apertures 101 being the same, substantially the same, and/or different from one or more other apertures 101 in the article 100. Additionally, the apertures 101 include any suitable orientation and/or spacing for facilitating cooling flow. Suitable spacing between the apertures 101 includes, but is not limited to, even, uniform, varied, gradient, and/or sectioned, with the spacing of each of the apertures 101 being the same, substantially the same, and/or different from one or more other aperture 101.

The geometry and/or spacing of the apertures 101 at least partially determines a cooling profile of the article 100. The cooling profile refers to parameters of fluid flow throughout the article 100, such as, but not limited to, concentration, distribution, and/or rate of fluid flow through the apertures 101. For example, in one embodiment, an increased number of apertures 101 and/or a decreased spacing between the apertures 101 increases an amount and/or concentration of cooling flow in a particular section. In another embodiment, a variation in size of the apertures 101 varies an amount of cooling flow through each of the apertures 101 and/or varies a rate of fluid flow through each of the apertures 101. In a further embodiment, varying the geometry and/or spacing of the apertures 101 along the article 100 varies the cooling profile throughout the outer region 205.

Referring to FIGS. 1-2, the article 100 also includes one or more conduits 103 extending from the outer surface 206 of the body portion. Each of the conduits 103 is positioned at one of the apertures 101 to controllably direct fluid from the inner region 203 to the outer region 205. For example, in one embodiment, an opening in the conduit 103 is aligned or substantially aligned with the aperture 101 to controllably direct the fluid flowing through the aperture 101 into the outer region 205. The article 100 includes any suitable number of conduits 103 up to an amount equal to the number of apertures 101. Although shown as including three rows of conduits 103, as will be appreciated by those skilled in the art, the article 100 may include an increased or decreased number of conduits 103, the number of conduits 103 being equal to or less than the number of apertures 101.

Figure 3:
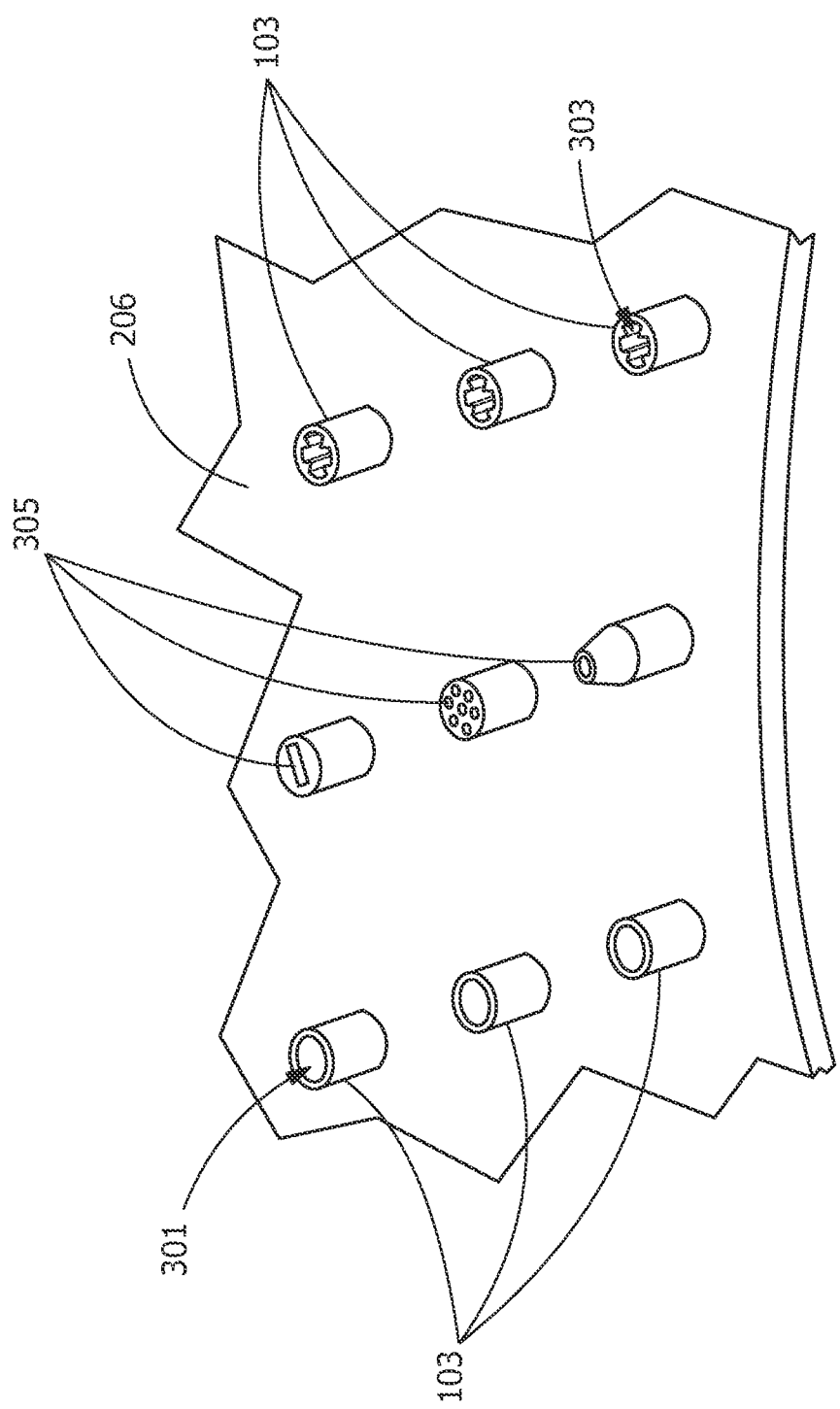
FIG. 3 is a section view of an article positioned within a component according to an embodiment of the disclosure.

An interior and/or exterior surface of each of the conduits 103 includes any suitable cross-sectional geometry. The cross-sectional geometries of the interior and/or exterior surfaces may be the same as, substantially the same as, or different from each other and/or the geometry of the apertures 101. Suitable geometries are uniform, substantially uniform, or varied throughout the article 100, and include, but are not limited to, circular, substantially circular, round, substantially round, non-round, star shaped, oval, square, triangular, polygonal, tear drop, varied, irregular, any other geometrical shape, or a combination thereof. For example, in one embodiment, as illustrated in FIG. 3, the conduit 103 includes a round or substantially round cross-sectional geometry 301 that extends the geometry of the aperture 101. In another example, the conduit 103 includes a non-round geometry, such as a star shaped cross-sectional geometry 303, that extends the non-round geometry of the aperture 101. Alternatively, the round, substantially round, non-round, and/or other cross-sectional geometry of the conduit 103 may differ from the geometry of the aperture 101, such as, for example, a non-round conduit positioned over a round or substantially round aperture. Other aspects of the conduits 103, such as, but not limited to, length, diameter, spacing, and/or angle are also the same as, substantially the same as, or different from the corresponding aspects of the apertures 101, and may be uniform, substantially uniform, or varied throughout the article 100.

The one or more conduits 103 are configured to maintain, extend, and/or modify the flow of fluid from the apertures 101. The configuration of the conduits 103 is selected to provide desired impingement flow and/or cooling. For example, in one embodiment, the conduits 103 having the same or substantially the same geometry as the apertures 101 extend the orientation of the apertures 101 to maintain the fluid flow through at least a portion of the outer region 205. In another embodiment, the conduits 103 differ from the orientation of the apertures 101 to modify a direction of the fluid flow from the apertures 101. In a further embodiment, the conduits 103 having differing geometries from the apertures 101 modify a profile and/or direction of the fluid flow from the apertures 101. Additionally or alternatively, the conduits 103 may include an orifice feature 305 opposite the outer surface 206 of the article 100. The orifice feature 305 includes any suitable feature for modifying fluid flow exiting the conduit 103, such as, but not limited to, a contraction (e.g., a slot and/or partial closing), multiple holes formed in the conduit 103, a narrowing (e.g., a funnel shape), or a combination thereof.

Figure 4:
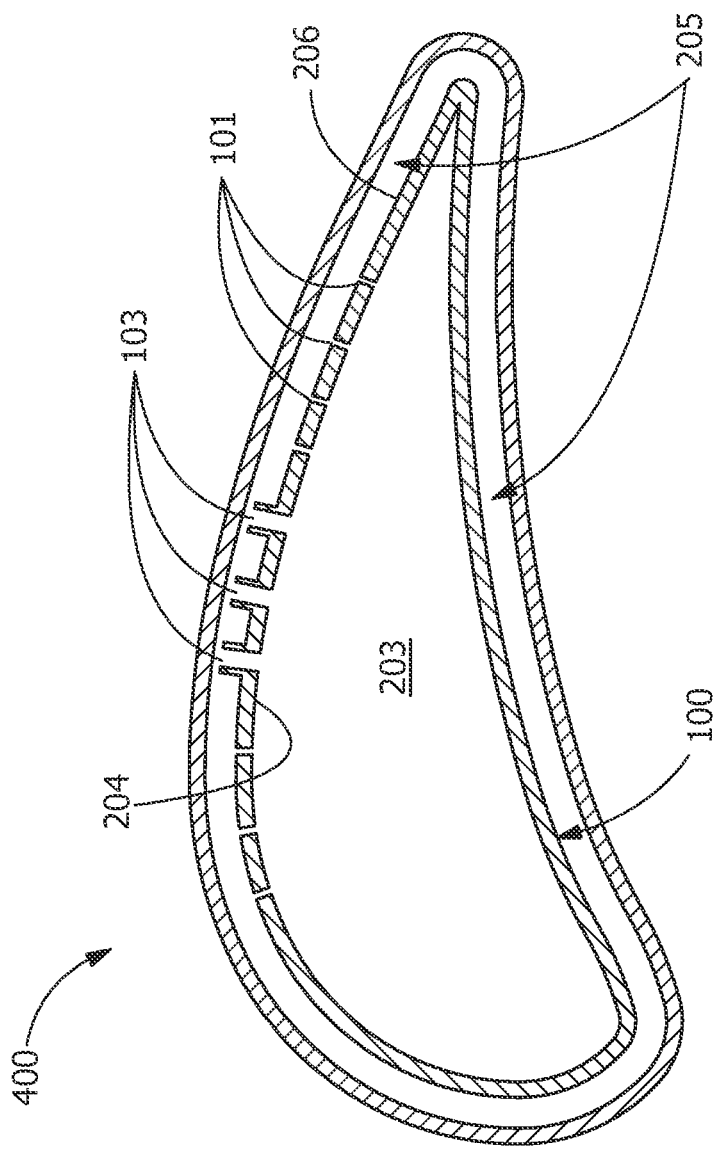
FIG. 4 is an enhanced view of an article according to an embodiment of the disclosure.

Turning to FIG. 4, in one embodiment, the article 100 is configured for insertion and/or positioning within a component 400. When inserted and/or positioned within the component 400, the outer region 205 of the article 100 extends between the outer surface 206 of the article and an inner surface 404 of the component 400. Additionally, when the article 100 is inserted and/or positioned within the component 400, the flow of fluid through the apertures 101 provides impingement cooling of the component 400. For example, a cooling fluid provided to the inner region 203 of the article 100 may pass through the apertures 101 and/or conduits 103 to the outer region 205 where the cooling fluid contacts the inner surface 404 of the component 400 to cool the component 400. The orientation and/or spacing of the apertures 101 and/or the conduits 103 at least partially determines an amount, direction, and/or concentration of the cooling fluid passing from the inner region 203 to the outer region 205.

By maintaining, extending, and/or modifying the flow of fluid from the apertures 101, the conduits 103 increase cooling efficiency of the article 100, provide cooling of the component 400 with a decreased amount of fluid, and/or facilitate the use of increased operating temperatures. For example, by extending a fluid outlet from the aperture 101 at the outer surface 206 of the article 100 to an end of the conduit 103 opposite the outer surface 206, the conduits 103 provide a distance between the fluid outlet and the inner surface 404 of the component 400 independent of the dimensions of the body portion 201. In one embodiment, the conduits 103 permit the use of a relatively smaller body portion 201, which increases a size of the outer region 205 between the outer surface 206 of the body portion 201 and the inner surface 404 of the component 400. In another embodiment, the increased size of the outer region 205 decreases cross-flow velocity in the outer region 205. The decreased cross-flow velocity in the outer region 205 decreases an effect of cross-flow on impingement fluid flow, facilitates increased control over the impingement fluid flow, increases cooling efficiency, and/or facilitates cooling with a decreased amount of fluid.

Additionally or alternatively, the conduits 103 decrease a distance between the fluid outlet and the inner surface 404 of the component 400. The decreased distance between the fluid outlet and the inner surface 404 of the component 400 decreases an exposure of the fluid to cross-flow within the outer region 205 and/or increases contact between the fluid and the inner surface 404, which increases cooling efficiency. Additionally or alternatively, the conduits 103 may be oriented to direct and/or concentrate the flow of fluid toward specific portions of the component 400, such as, but not limited to, hot spots, a hot side wall of the component 400, hard to reach portions including a trailing edge portion of a turbine nozzle (see FIGS. 1-2), or a combination thereof. The decreased distance between the fluid outlet of the conduits 103 and/or the directing and/or concentrating of the flow of fluid through the conduits 103 facilitate use of a decreased amount of cooling fluid, increase cooling efficiency of the cooling fluid as compared to apertures 101 alone, facilitate higher temperature operation of the component 400, increase thru put, and/or increase operating efficiency.

Figure 5:
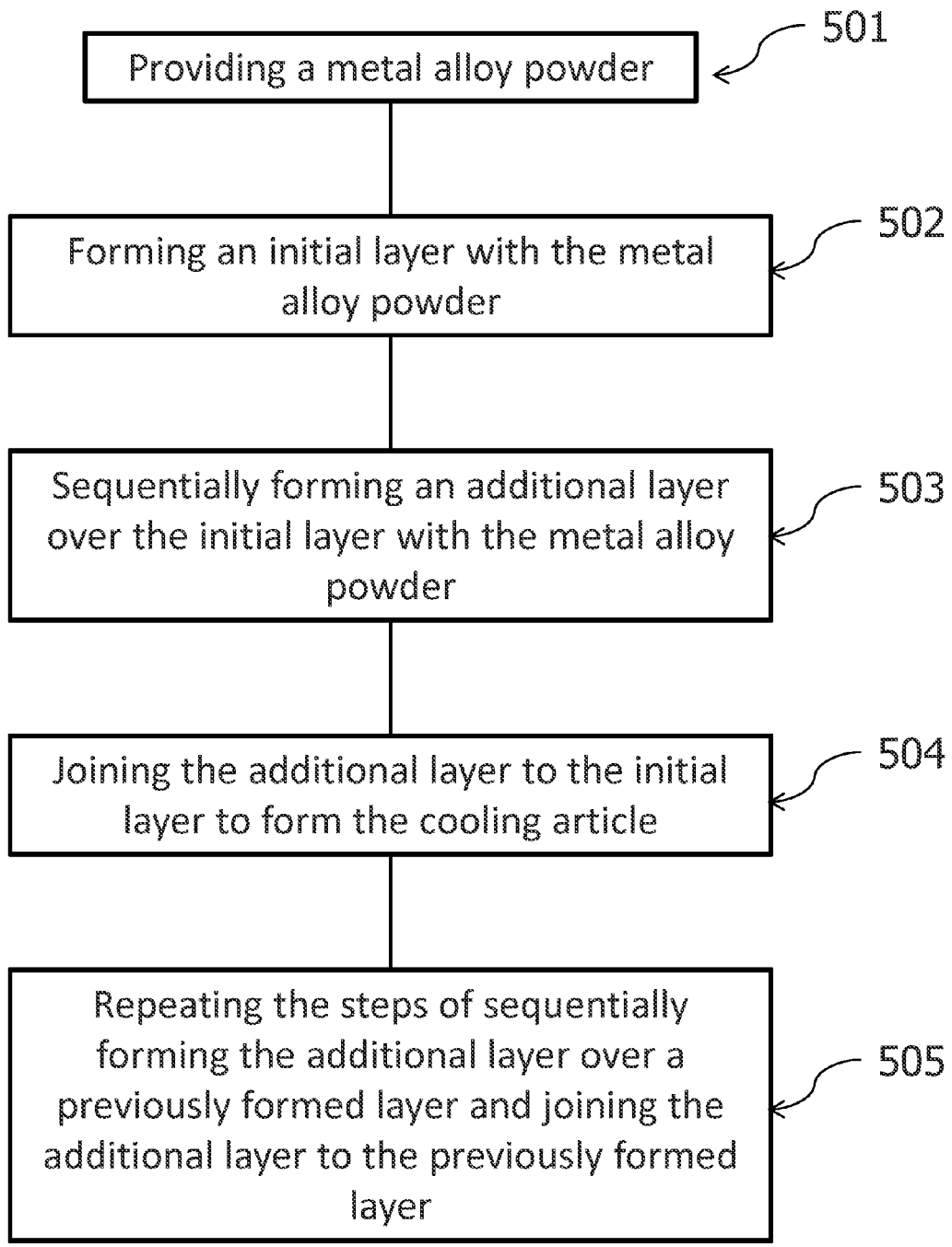
FIG. 5 is a process view of a method of forming an article according to an embodiment of the disclosure.
Figure 6:
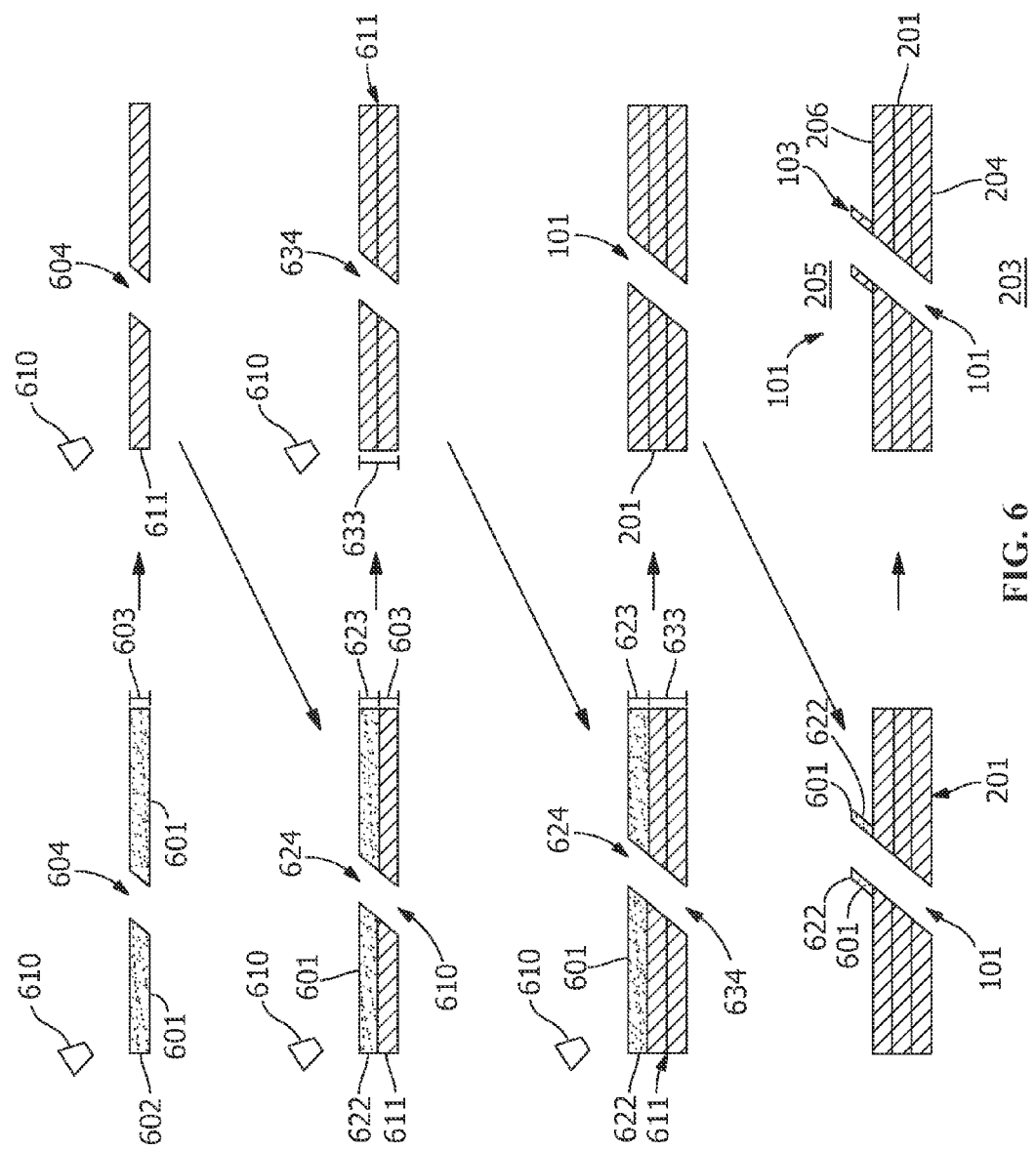
FIG. 6 is a schematic view of a method of forming an article according to an embodiment of the disclosure.

In one embodiment, forming the article 100 and/or the conduit(s) 103 includes any suitable additive manufacturing method. Referring to FIGS. 5-6, in another embodiment, the additive method 500 includes making and/or forming net or near-net shape articles 100 and/or conduits 103. As used herein, the phrase "near-net" refers to the article 100 and/or conduits 103 being formed with a geometry and size very similar to the final geometry and size of the article 100 and/or conduits 103, requiring little or no machining and processing after the additive method 500. As used herein, the phrase "net" refers to the article 100 and/or conduits 103 being formed with a geometry and size requiring no machining and processing. For example, in one embodiment, the additive method 500 includes making the article 100 including the one or more aperture 100 and/or the one or more conduit 103. The additive method 500 provides any net or near-net shape to the articles 100, the aperture(s) 101, and/or the conduit(s) 103. Additionally or alternatively, the additive method 500 includes forming the article 100 separate from the one or more conduit 103, then securing the one or more conduit 103 to the article 100. Although described with regard to the aperture(s) 101 being formed during the additive method 500, as will be appreciated by those skilled in the art, at least one of the aperture(s) 101 may be machined into the article 100 after the additive method 500, without affecting the net or near-net geometry of the article 100.

The additive method 500 includes any manufacturing method for forming the article 100 and/or conduits 103 through sequentially and repeatedly depositing and joining material layers. Suitable manufacturing methods include, but are not limited to, the processes known to those of ordinary skill in the art as Direct Metal Laser Melting (DMLM), Direct Metal Laser Sintering (DMLS), Laser Engineered Net Shaping, Selective Laser Sintering (SLS), Selective Laser Melting (SLM), Electron Beam Melting (EBM), Fused Deposition Modeling (FDM), or a combination thereof. In one embodiment, for example, the additive method 500 includes providing a metal alloy powder 601 (step 501); forming an initial layer 602 with the metal alloy powder 601 (step 502); sequentially forming an additional layer 622 over the initial layer 602 with the metal alloy powder 601 (step 503); and joining the additional layer 622 to the initial layer 602 to form the article 100 and/or conduits 103 (step 504). In another embodiment, the additive method 500 includes repeating the steps of sequentially forming the additional layer 622 over a previously formed layer and joining the additional layer 622 to the previously formed layer (step 505) until the article 100 and/or conduit(s) 103 having a predetermined thickness and/or a predetermined shape are obtained. The previously formed layer includes any portion 611 of the article 100 and/or conduits 103 including the initial layer 602 and/or any other additional layer(s) 622 directly or indirectly joined to the initial layer 602.

The initial layer 602 includes a preselected thickness 603 and a preselected shape, which includes at least one first opening 604. Each of the additional layers 622 includes a second preselected thickness 623 and a second preselected shape, the second preselected shape including at least one second opening 624 corresponding to the at least one first opening 604 in the initial layer 602. The second preselected thickness 623 and/or the second preselected shape may be the same, substantially the same, or different between one or more of the additional layers 622. When joined, the preselected thickness 603 of the initial layer 602 and the second preselected thickness 623 of the additional layer(s) 622 form a combined thickness 633 of the portion 611. Additionally, the at least one first opening 604 and the corresponding at least one second opening 624 form one or more combined openings 634 in the portion 611. Once the article 100 is formed, the one or more combined opening 634 form the one or more apertures 101 fluidly connecting the inner region 203 to the outer region 205 of the portion 611.

In one embodiment, the additive method 500 includes the DMLM process. In another embodiment, the DMLM process includes providing the metal alloy powder 601 and depositing the metal alloy powder 601 to form an initial powder layer. The initial powder layer has the preselected thickness 603 and the preselected shape including the at least one first opening 604. In a further embodiment, the DMLM process includes providing a focused energy source 610, and directing the focused energy source 610 at the initial powder layer to melt the metal alloy powder 601 and transform the initial powder layer to the portion 611 of the article 100 and/or conduits 103. Suitable focused energy sources include, but are not limited to, laser device, an electron beam device, or a combination thereof.

Next, the DMLM process includes sequentially depositing additional metal alloy powder 601 over the portion 611 of the article 100 and/or conduits 103 to form the additional layer 622 having the second preselected thickness 623 and the second preselected shape including the at least one second opening 624 corresponding to the at least one first opening 604 in the initial powder layer 602. After depositing the additional layer 622 of the metal alloy powder 601, the DMLM process includes melting the additional layer 622 with the focused energy source 610 to increase the combined thickness 633 and form the at least one combined opening 634 having a predetermined profile.

The steps of sequentially depositing the additional layer 622 of the metal alloy powder 601 and melting the additional layer 622 may then be repeated to form the net or near-net shape article 100 and/or conduits 103. For example, the steps may be repeated until the article 100 having the predetermined thickness, the predetermined shape, and the one or more apertures 101 having any suitable geometry is obtained. Additionally, the steps may be repeated to form the one or more conduits 103 directly over at least one of the one or more apertures 101. In one embodiment, the one or more conduits 103 include support members configured to provide support during the additive method 500. The support members may form a portion of the article 100, or may be removed after formation to form the article 100 devoid or substantially devoid of support members.

As discussed in detail above, and as illustrated in FIGS. 7-9, the conduits 103 are normal and/or angled relative to the body portion 201, and may be formed to maintain, extend, and/or modify the flow of fluid from the apertures 101. For example, as shown in FIG. 7, the conduit 103 extends the orientation and cross-sectional geometry of the aperture 101. In another example, as illustrated in FIG. 8, the conduit 103 is angled relative to the body portion 201, the angle of the conduit 103 maintaining the cross-section geometry while modifying the orientation of the aperture 101. The angle may also be selected to provide support during the additive manufacturing of the article 100. Suitable angles for modifying the orientation of the aperture 101 and/or providing support during the additive manufacturing include, but are not limited, to between 1° and 179°, between 30° and 150°, between 1° and 90°, between 45° and 135°, between 30° and 90°, between 90° and 150°, between 45° and 90°, between 90° and 135°, about 45°, about 90°, about 135°, or any combination, sub-combination, range, or sub-range thereof. Additionally or alternatively, as illustrated in FIG. 9, the cross-sectional geometry of the conduit 103 may differ from that of the aperture 101.

In one embodiment, the additive method 500 includes forming the orifice feature 305 on the conduit 103. In another embodiment, the conduit 103 and the orifice feature 305 are formed during the forming of the article 100. Additionally or alternatively, the conduit 103 and/or the orifice feature 305 may be formed separately from and/or after the forming of the article 100. For example, the conduit 103 and/or the orifice feature 305 may be formed directly on a previously formed article 100 using the additive method 500, or the conduit 103 and/or the orifice feature 305 may be formed separate from the article 100 then attached to the article 100. Forming the conduit 103 and/or the orifice feature 305 separate from the article 100 may include either the additive method 500 or a non-additive method such as machining and/or casting.

While the invention has been described with reference to one or more embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. In addition, all numerical values identified in the detailed description shall be interpreted as though the precise and approximate values are both expressly identified.

What is claimed is:

1. An article, comprising:
   a body portion separating an inner region and an outer region;
   an aperture in the body portion, the aperture fluidly connecting the inner region to the outer region; and
   a conduit extending from an outer surface of the body portion at the aperture and being arranged and disposed to controllably direct cooling fluid from the inner region to the outer region,
   wherein the conduit includes at least one of:
      an orifice feature opposite the outer surface of the article selected from the group consisting of a slot, multiple holes formed in the conduit, and combinations thereof;
      a cross-sectional geometry of an interior surface of the conduit selected from the group consisting of non-round, star shaped, oval, square, triangular, polygonal, tear drop, varied, irregular, and combinations thereof; and
      a bend along the length of the conduit.

2. The article of claim 1, further comprising at least one additional aperture in the body portion, the at least one additional aperture fluidly connecting the inner region to the outer region.

3. The article of claim 2, further comprising at least one additional conduit, each of the at least one additional conduits formed over one of the at least one additional apertures.

4. The article of claim 1, wherein the conduit extends a shape of the aperture.

5. The article of claim 1, wherein the conduit includes the non-round cross-sectional geometry.

6. The article of claim 1, wherein the conduit is arranged and disposed to modify a flow of fluid from the aperture.

7. The article of claim 1, wherein the article comprises an impingement member of a turbine nozzle.

8. The article of claim 1, wherein the conduit comprises the orifice feature opposite the outer surface of the article.

9. The article of claim 8, wherein the orifice feature contracts the conduit.

10. The article of claim 8, wherein the orifice feature comprises the multiple holes formed in the conduit.

11. A component, wherein the component includes the article of claim 1, the article being arranged and disposed to direct cooling fluid toward an inner surface of the component.

12. The component of claim 11, wherein the conduit of the article directs the flow of cooling fluid from the aperture to a hot spot on the component.

13. A method of forming an article, the method comprising:
   providing a body portion separating an inner region and an outer region;
   providing an aperture in the body portion, the aperture fluidly connecting the inner region to the outer region; and
   forming a conduit over the aperture, the conduit extending from an outer surface of the body portion at the aperture and being arranged and disposed to controllably direct cooling fluid from the inner region to the outer region,
   wherein the article includes an impingement member of a hot gas path component of a turbine engine, and
   wherein forming the conduit includes at least one of:
      forming an orifice feature opposite the outer surface of the article selected from the group consisting of a slot, multiple holes formed in the conduit, and combinations thereof;
      forming a cross-sectional geometry of an interior surface of the conduit selected from the group consisting of non-round, star shaped, oval, square, triangular, polygonal, tear drop, varied, irregular, and combinations thereof; and forming a bend along the length of the conduit.

14. The method of claim 13, wherein the providing of the body portion includes forming the body portion, and the providing of the aperture includes forming the aperture in the body portion.

15. The method of claim 14, wherein at least one of forming the body portion, forming the aperture, and forming the conduit comprises additive manufacturing.

16. The method of claim 15, wherein the additive manufacturing comprises direct metal laser melting.

17. The method of claim 14, further comprising forming at least one additional aperture in the body portion and at least one additional conduit on the outer surface of the body portion at the at least one additional aperture.

18. The method of claim 13, wherein the conduit is arranged and disposed to direct a cooling air flow from the aperture toward a hot spot of the hot gas path component.

19. The method of claim 13, wherein forming the conduit over the aperture comprises arranging and disposing the conduit to modify a flow of the cooling fluid from the aperture.

20. The method of claim 13, comprising forming the orifice feature on the conduit, opposite the outer surface of the body portion.

* * * * *